United States Patent
Bell et al.

(10) Patent No.: US 9,717,106 B2
(45) Date of Patent: *Jul. 25, 2017

(54) SYSTEM FOR UTILIZING IDENTITY BASED ON PAIRING OF WIRELESS DEVICES

(71) Applicant: Cisco Technology, Inc., San Jose, CA (US)

(72) Inventors: Robert T. Bell, Bountiful, UT (US); Larry William Truesdale, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/154,270

(22) Filed: May 13, 2016

(65) Prior Publication Data

US 2016/0255666 A1    Sep. 1, 2016

Related U.S. Application Data

(63) Continuation of application No. 12/133,955, filed on Jun. 5, 2008, now Pat. No. 9,363,108.

(51) Int. Cl.
| | |
|---|---|
| *H04W 76/02* | (2009.01) |
| *H04L 12/66* | (2006.01) |
| *H04L 29/06* | (2006.01) |
| *H04M 3/56* | (2006.01) |
| *H04W 4/00* | (2009.01) |

(Continued)

(52) U.S. Cl.
CPC .......... *H04W 76/021* (2013.01); *H04L 12/66* (2013.01); *H04L 63/0823* (2013.01); *H04L 63/0853* (2013.01); *H04M 3/56* (2013.01); *H04W 4/008* (2013.01); *H04W 8/205* (2013.01); *H04W 12/04* (2013.01); *H04W 76/023* (2013.01); *H04W 84/18* (2013.01)

(58) Field of Classification Search
CPC .... H04L 12/5865; H04L 12/588; H04L 51/20
USPC ......................................................... 370/352
See application file for complete search history.

(56) References Cited

U.S. PATENT DOCUMENTS

| | | |
|---|---|---|
| 6,766,160 B1 | 7/2004 | Lemilainen et al. |
| 6,857,072 B1 | 2/2005 | Schuster et al. |

(Continued)

OTHER PUBLICATIONS

Specification of the Bluetooth System, Version 2.1, dated Jul. 26, 2007, downloaded Mar. 17, 2008, Bluetooth.

(Continued)

*Primary Examiner* — Edan Orgad
*Assistant Examiner* — Emmanuel Maglo
(74) *Attorney, Agent, or Firm* — Edell, Shapiro & Finnan, LLC

(57) ABSTRACT

In one embodiment, an apparatus may include a memory and a processor. The processor may be operable to create a wireless connection to a wireless device. The processor may be operable to form a pairing with the wireless device based on a unique identifier of the wireless device. The unique identifier may be received from the wireless device. The unique identifier may identify the wireless device in the pairing. The processor may be operable to receive user data associated with the unique identifier from a database. The processor may be operable to initiate configuration of an IP telephony service, where the configuration based, at least in part, on the user data.

22 Claims, 2 Drawing Sheets

(51) Int. Cl.
*H04W 8/20* (2009.01)
*H04W 12/04* (2009.01)
*H04W 84/18* (2009.01)

(56) References Cited

U.S. PATENT DOCUMENTS

| | | | |
|---|---|---|---|
| 7,242,923 B2 | 7/2007 | Perera et al. | |
| 7,443,817 B2 | 10/2008 | Farnham | |
| 8,296,147 B2* | 10/2012 | Sharma | G06Q 10/06 379/88.01 |
| 8,447,352 B2* | 5/2013 | Forte | H04M 3/42229 379/242 |
| 8,477,758 B2* | 7/2013 | Kafka | H04L 12/66 370/220 |
| 8,599,832 B2* | 12/2013 | Altberg | H04M 7/006 370/352 |
| 8,725,811 B2* | 5/2014 | Srivastava | G06Q 10/109 709/206 |
| 8,799,352 B2* | 8/2014 | Cohen | H04M 3/42093 709/203 |
| 9,208,498 B2* | 12/2015 | Faber | G06Q 30/02 |
| 9,379,914 B2* | 6/2016 | Lu | H04L 12/66 |
| 2002/0126701 A1* | 9/2002 | Requena | H04L 12/581 370/469 |
| 2002/0141586 A1 | 10/2002 | Margalit et al. | |
| 2003/0014372 A1 | 1/2003 | Wheeler et al. | |
| 2004/0002902 A1 | 1/2004 | Muehlhaeuser | |
| 2005/0010780 A1 | 1/2005 | Kane et al. | |
| 2005/0086300 A1 | 4/2005 | Yeager et al. | |
| 2005/0239453 A1 | 10/2005 | Vikberg et al. | |
| 2005/0286466 A1 | 12/2005 | Tagg et al. | |
| 2006/0007920 A1* | 1/2006 | Michel | H04W 88/02 370/352 |
| 2006/0083187 A1 | 4/2006 | Dekel | |
| 2006/0293028 A1 | 12/2006 | Gadamsetty et al. | |
| 2007/0016444 A1 | 1/2007 | Holkkola | |
| 2007/0030824 A1 | 2/2007 | Ribaudo et al. | |
| 2007/0178882 A1 | 8/2007 | Teunissen et al. | |
| 2007/0274270 A1 | 11/2007 | Jones et al. | |
| 2007/0277230 A1 | 11/2007 | Hawkins et al. | |
| 2008/0140868 A1 | 6/2008 | Kalayjian et al. | |
| 2008/0159266 A1 | 7/2008 | Chen et al. | |
| 2008/0292074 A1* | 11/2008 | Boni | H04M 3/54 379/93.11 |
| 2009/0081999 A1 | 3/2009 | Khasawneh et al. | |
| 2009/0170519 A1 | 7/2009 | Wilhoite et al. | |
| 2009/0198997 A1 | 8/2009 | Yeap et al. | |
| 2009/0201917 A1 | 8/2009 | Maes et al. | |
| 2009/0247194 A1 | 10/2009 | Tarrago et al. | |
| 2009/0325491 A1 | 12/2009 | Bell et al. | |

OTHER PUBLICATIONS

Simple Pairing Whitepaper, V10r00, dated Aug. 5, 2006, downloaded Mar. 17, 2008, Bluetooth Special Interest Group.

* cited by examiner

SYSTEM FOR UTILIZING IDENTITY BASED ON PAIRING OF WIRELESS DEVICES

CROSS-REFERENCE TO RELATED APPLICATIONS

This application is a continuation of U.S. patent application Ser. No. 12/133,955, filed Jun. 5, 2008, the entire contents of which is incorporated herein by reference.

BACKGROUND

The present disclosure relates generally to wireless systems.

Bluetooth is a specification for wireless personal area networks (PANs). Bluetooth provides a standard way to connect and exchange information between devices with wireless circuitry such as mobile phones, headsets, laptops, personal computers, and Internet Protocol (IP) Telephony devices, over a short-range radio frequency. Part of the Bluetooth specification describes a method for a first Bluetooth compliant device to discover a second Bluetooth compliant device when the first and second Bluetooth compliant devices are brought within range of each other. The Bluetooth specification also describes at least one method of authenticating Bluetooth devices.

The discovery and authentication processes may also be streamlined using Bluetooth pairing. Bluetooth pairing occurs when two Bluetooth compliant devices agree to communicate with one another. The two devices join what is known as a trusted pair. When one device recognizes another device in an established trusted pair, each device automatically accepts a connection from the other, bypassing the complete discovery and authentication processes that would otherwise occur when the devices are first brought within range of each other.

Version 2.1 of the Bluetooth specification introduced Secure Simple Pairing. Secure Simple Pairing is based on each of the two Bluetooth compliant devices having a public key and a private key. The private keys are generally not transmitted from either device and are used for encrypting data sent to the other device. The public keys are transmitted during the pairing process. A public key may be used to authoritatively verify that a device transmitting the public key is a trusted device by decrypting the encrypted data sent by the device. The encrypted data may only be decrypted using the public key of the device if the corresponding private key was used to encrypt the data

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DESCRIPTION OF EXAMPLE EMBODIMENTS

Overview

Figure 1:
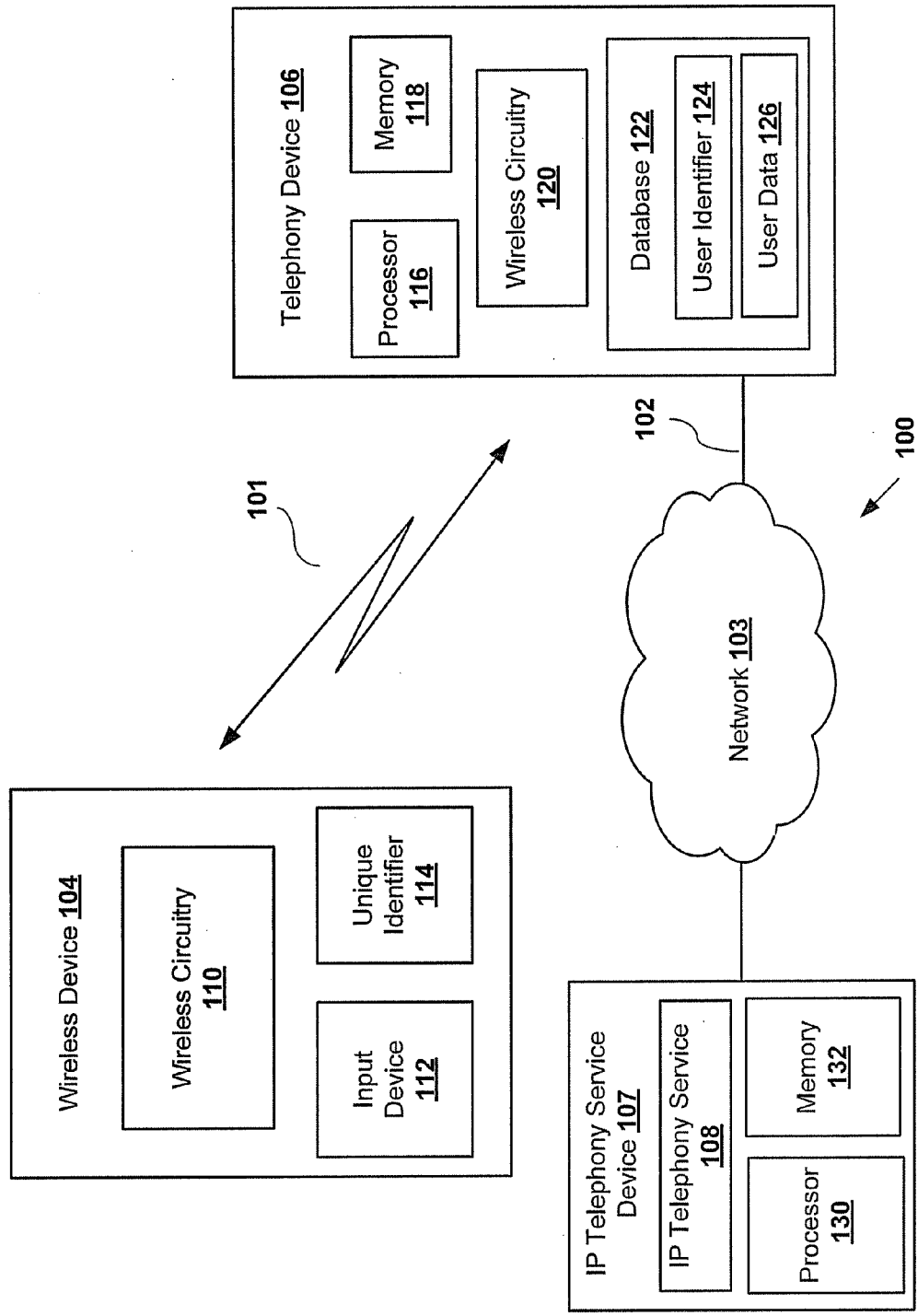
FIG. 1 illustrates one embodiment of a system for utilizing an identity based on a pairing of wireless devices.

By way of introduction, the example embodiments described below include an apparatus, logic encoded in a tangible media, and a method for utilizing an identity based on a pairing of wireless devices.

According to a first embodiment, an apparatus is provided. A processor is operable to create a wireless connection to a wireless device. The processor is operable to form a pairing with the wireless device based on a unique identifier of the wireless device. The unique identifier is received from the wireless device. The unique identifier identifies the wireless device in the pairing. The processor is operable to receive user data associated with the unique identifier from a database. The processor is further operable to initiate configuration of an Internet Protocol telephony service, where the configuration is based, at least in part, on the user data.

In a second embodiment, logic encoded in a tangible media is provided. The logic when executed is operable to create a wireless connection to a wireless device. The logic when executed is also operable to form a pairing with the wireless device based on a unique identifier of the wireless device. The unique identifier is received from the wireless device. The unique identifier identifies the wireless device in the pairing. The logic when executed is further operable to receive user data associated with the unique identifier from a database. The logic when executed is also operable to initiate configuration of an Internet Protocol telephony service, the Internet Protocol telephony service communicating or operating pursuant to the user data.

In a third embodiment, a method is provided. A wireless communications path between first and second devices is established. User data associated with the first device is retrieved. An Internet Protocol telephony communications path is established between the second and a third device. The Internet Protocol telephony communications path is established using or communicates the user data.

The present invention is defined by the following claims, and nothing in this section should be taken as a limitation on those claims. Further aspects and advantages of the invention are discussed below in conjunction with the example embodiments.

EXAMPLE EMBODIMENTS

A system for utilizing an identity based on a pairing of wireless devices may configure Internet Protocol (IP) services based on the identity. For example, a user wearing a Bluetooth headset may walk into a conference room for a scheduled meeting. A telephone in the conference room may form a pairing with the Bluetooth headset. The telephone may automatically make a Voice over Internet Protocol (VoIP) call to another participant of the scheduled meeting. Alternatively, the telephone may automatically join the headset with an existing VoIP call already made from the telephone. The telephone may identify the user making the call based on an identifier stored in the headset. For example, the telephone may identify the user by looking up the identifier in a database.

FIG. 1 illustrates one embodiment of a system 100 for utilizing an identity based on a pairing of wireless devices, 104 and 106. The system 100 may include a wireless device 104, a telephony device 106, and an Internet Protocol (IP) telephony service device 107. The system 100 may include additional, different, or fewer components. For example, the system 100 may also include a wireless connection 101 between the wireless device 104 and the telephony device 106. The system 100 may also include an IP telephony connection 102 between the telephony device 106 and another device on a network 103.

As applied to the example above with the user wearing the Bluetooth headset and walking into the conference room, the Bluetooth headset may be the wireless device 104. The telephone may be the telephony device 106. The telephony service device 108 may be a VoIP call agent. The VoIP call may be the IP telephony connection 102.

The wireless device 104 may be any portable device that contains wireless circuitry 110, such as a headset, cell phone, personal digital assistant, laptop, or radio-frequency identification (RFID) tag. The wireless • circuitry 110 may be any circuitry operable to communicate with another wireless device without a wire line. For example, the wireless circuitry 110 may be operable to implement the Bluetooth or other now known or later developed standard. In other examples, the device 104 has limited mobility, such as a Bluetooth capable household appliance.

The wireless device 104 may contain an input device 112, such as a microphone, keypad, button, joystick, mouse, keyboard, etc. In other examples, such as an RFID tag, the wireless device 104 may have no input device 112.

The wireless device 104 may store a unique identifier 114. The unique identifier 114 may be unique to the wireless device 104 or to a user of the wireless device 104. The unique identifier 114 may include, for example, a public key, a globally unique identifier, a username, a user identifier (UID), a certificate, and/or a personal identification number (PIN). The unique identifier 114 may be generated through an automated process or entered manually. For example, the wireless device 104 may generate a public key when the wireless circuitry 110 is first used. Alternatively, a PIN may be entered by a user with the input device 114 of the wireless device 104. In still other examples, the unique identifier 114 may be received from some other source, such as from a directory service.

The telephony device 106 may be any device operable to create the IP telephony connection 102, such as a hard phone, a soft phone, a mobile phone, a conference phone, a teleconferencing unit, a personal computer, or laptop. In other examples, the telephony device 106 may be a combination of devices, such as a conference phone in communication with a personal computer. The IP telephony connection 102 may be any instant messaging connection or voice over data connection. Examples of an instant messaging connection may be any connection created with Yahoo! Messenger Protocol, Microsoft Notification Protocol, or other now known or later developed messaging protocol. A voice over data connection may be any connection that transmits an audio, a visual, or an audiovisual signal over a network designed to exchange data, such as a Voice over Internet Protocol (VoIP) connection and a voice connection established with Jabber. Jabber includes instant messaging technology and provides a set of standards for real-time communications. For example, the IP telephony connection 102 may be a connection based on a VoIP protocol such as Session Initiation Protocol (SIP), Inter-Asterisk eXchange, H.323, Skype's proprietary protocol, Skinny Client Control Protocol (SCCP) or GoogleTalk.

The telephony device 106 may include a processor 116, a memory 118, wireless circuitry 120, and a database 122. The telephony device 106 may include additional, different, or fewer components.

The memory 118 may be any now known, or later discovered, storage device. The memory 118 may be a non-volatile and/or volatile memory, such as a random access memory (RAM), a read-only memory (ROM), an erasable programmable read-only memory (EPROM), or flash memory. The memory 118 may include an optical, magnetic (hard-drive) or other memory device.

The processor 116 may be in communication with the memory 118. The processor 118 may be a general processor, central processing unit, server, application specific integrated circuit (ASIC), digital signal processor, field programmable gate array (FPGA), digital circuit, analog circuit, or combinations thereof. The processor 116 may also be in communication with additional components, such as the wireless circuitry 120.

The wireless circuitry 120 may be any circuitry operable to communicate with another wireless device without a wire line. For example, the wireless circuitry 120 may be a transceiver, transmitter, or receiver operable to implement the Bluetooth standard.

The wireless connection 101 may be any connection created between the wireless circuitry 120 of the telephony device 106 and wireless circuitry 110 of the wireless device 104. The network 103 may be a Local Area Network (LAN), a Wireless Local Area Network (WLAN), a Wide Area Network (WAN), or any other now known or later developed communications network.

The database 122 may be any electronic collection of information that is organized so that the information may be accessed, managed, and updated, such as a Relational Database Management System (RDBMS), an object-oriented database, an extensible markup language (XML) database, a file system, memory structures, or other now known or later developed database. The database 122 may use any type of memory and structure, such as a random access memory (RAM), a read-only memory (ROM), an erasable programmable read-only memory (EPROM), flash memory, optical memory, magnetic (hard-drive or tape) memory or other memory device.

The database 122 may include database entries. A database entry is information that may be received from or stored in the database 122. The database entry may be accessed or looked-up using a unique key, such as a primary key value, a full path name, or a memory address. For example, the database entry may be a row in a table in an RDBMS. In other examples, the database entry may be stored across multiple locations in the database 122, such as across multiple tables in an RDBMS. A table in an RDBMS may include one or more columns. The database 122 may include a collection of databases.

During operation, the processor 116 may be operable to send database entries to the database 122 and to receive database entries from the database 122. In some examples, the database 122 may not be included in the telephony device 106 and may instead be located elsewhere in the system 100. For example, a server, computer, or remotely located telephony device operates the database 122. In such examples, the processor 116 may be operable to access the database 122 via the network 103.

The telephony device 106 may communicate with an IP telephony service 108 via the network 103, where the IP telephony service 108 is included in the IP telephony service device 107. The IP telephony service 108 may be any software or device operable to receive, create, configure, or otherwise manage IP telephony connections, such as an instant messaging server, an IP gateway, an IP Private Branch Exchange (IP-PBX), a conferencing bridge, a network telephony server (e.g., a redirect server, a proxy server, or a registrar), another telephony device, a video server, a collaboration server, and a presence server.

The IP telephony service 108 may include a processor 130 and a memory 132. The memory 132 may be any now known, or later discovered, storage device. The memory 132 may be a non-volatile and/or volatile memory, such as a random access memory (RAM), a read-only memory (ROM), an erasable programmable read-only memory (EPROM), or flash memory. The memory 132 may include an optical, magnetic (hard-drive) or other memory device. The processor 130 may be in communication with the memory 132. The processor 130 may also be in communication with additional components. The processor 130 may be a general processor, central processing unit, server, application specific integrated circuit (ASIC), digital signal processor, field programmable gate array (FPGA), digital circuit, analog circuit, or combinations thereof.

During operation of the system 100, the database 122 may include different kinds of database entries, such as one or more unique identifiers 114 and associated user data 126. The database 122 may include fewer or more database entries. One or more database entries may be associated in the database 122 with one or more other database entries. For example, each of the unique identifiers 114 may be associated with user data 126.

Any method of associating database entries in a database 122, now known or later discovered, may be used. In some examples, a first database entry is associated with a second database entry by including a unique key in the second database entry to identify the first database entry. In other examples, the first database entry is associated with the second database entry by including a unique key in the first database entry to identify the second database entry. In still other examples, the database 122 includes an association database entry, where the association database entry includes a unique key to identify the first database entry and a unique key to identify the second database entry.

The telephony device 106 may initiate configuration of the IP telephony service 108 in response to a pairing between the wireless device 104 and the telephony device or at some point after the pairing. Initiating configuration of the IP telephony service 108 may include, creating the IP telephony connection 102 using the IP telephony service 108, configuring the IP telephony connection 102 created using the IP telephony service 108, and/or transmitting the user data to the IP telephony service 108.

A pairing between the wireless device 104 and the telephony device 106 may be formed after the wireless device 104 and the telephony device 106 are brought into range of each other. Pairing occurs when two wireless devices agree to communicate with one another, such as establishing a trusted pair. When one device recognizes another device in an established trusted pair, each device automatically accepts a connection from the other, bypassing the complete discovery and authentication processes that would otherwise occur when the devices are brought within range of each other. Other verification, such as the complete discovery and authentication process, may be used.

For example, if the wireless device 104 and the telephony device 106 are Bluetooth compliant and support Secure Simple Pairing, the pairing may be Secure Simple Pairing. The unique identifier 114 may include a public key of the wireless device 104. According to the Bluetooth 2.1 specification, the public key may be automatically transmitted in the process of pairing. Pairing may additionally or alternatively involve manual entry of a shared secret, such as a PIN, using the input device 112 of the wireless device 104.

A public key stored on the wireless device 104 may be the unique identifier 114. If the wireless device 104 is primarily or exclusively used by one user, then the unique identifier 114 may be used to identify that user. The telephony device 106 may store the unique identifier 114 in the database 122 and associate user data 126 with the unique identifier 114. The user data 126 may include information relating to the user or a group of users of the wireless device 104, such as a name, a phone number, a UID, user schedule information, user meeting information, and/or an account number.

When the telephony device 106 receives the unique identifier 114, the telephony device 106 may retrieve the associated user data 126 from the database 122. The telephony device 106 may then create or configure the IP telephony connection 102 using the user data 126.

For example, the telephony device 102 may include the user's name in a parameter of an invite message transmitted when initiating the IP telephony connection 102. In another example, the user's name may be a parameter included in an ancillary message, such as an Info message when using SIP or a setup message when using a H.225 messaging sequence. The IP telephony service 108 may receive that parameter and associate the user's name with the IP telephony connection 102. The IP telephony service 108 may be, for example, a conference bridge. The IP telephony service 108, such as the conference bridge, may display or transmit information about a conference call, such as the names of the users currently on the conference call.

Consider a scenario where multiple people, each wearing or carrying a Bluetooth enabled wireless device 104, enter a conference room for a scheduled meeting. A Bluetooth enabled telephony device 106 in the conference room may discover each of the Bluetooth enabled wireless devices 104. The telephony device 106 may receive meeting information, such as conference call information, from the database 122 or some other database, such as a calendaring server. The telephony device 106 may automatically create calls to a conferencing bridge 108 with a separate IP telephony connection 102 for each of the discovered wireless devices 104. When creating each of the respective calls, the telephony device 106 may use information included in the user data 126. As in the previous example, the telephony device 106 may receive the user data 126 from the database 122 with unique identifiers 114 received from the wireless devices 104.

Alternatively, the telephony device 106 may only create a single call to a conferencing bridge 108 with a single IP telephony connection 102. The telephony device 106 may include a speaker phone. The telephony device 106 may transmit a current speaker's voice over the single IP telephony connection 102. In such an example, the telephony device 106 may transmit the user data 126 to the conferencing bridge 108 or to some other component. To transmit the user data 126, the telephony device 106 may configure the previously created IP telephony connection 102 with user data 126, which is associated with the current speaker. Additionally or alternatively, the telephony device 106 may transmit the user data 126 via some other connection, such as TCP/IP connection. The user data 126 may include, for example, the names of all of the users of the wireless devices 104 present in the conference room. In some examples, if each of the wireless devices 104 includes a microphone 112, the telephony device 106 may determine who the current speaker is based on a signal received from the microphone 112 of the respective wireless device 104. The transmitted user data 126 may then include the user data 126 associated with the unique identifier received from the wireless device 104 used by the current speaker.

In Other examples, the telephony device 106 may receive voice signals from each of the wireless devices 104 and mix them into a single signal for transmission over the IP telephony connection 102. The telephony device 106 may similarly identify the speaker using the voice signals received from each of the wireless devices 104.

There are other examples where the telephony device 106 may use the IP telephony service 108 to create the IP telephony connection 102 in response to the telephony device 106 receiving a signal from the wireless device 104. For example, a person brings the wireless device 104 into range of the telephony device 106, where the wireless device 104 is connected over a long-range wireless network to another device. The long-range wireless network may be a cellular network of base stations, and the other device may be a cell phone. The wireless device 104 may have destination information that identifies an address of the other device's user, the other device, or an active conference call. The destination information may be a telephone number, a VoIP address, etc.

When the person brings the wireless device 104 into range of the telephony device 106, the two devices may form a trusted pair. In the process of forming a pairing between the wireless device 104 and the telephony device 106, the telephony device 106 may receive the unique identifier 114. The telephony device 106 may receive the user data 126 associated with the unique identifier 114 from the database 122. The wireless device 104 may transmit the destination information to the telephony device 106. In response to pairing, the telephony device 106 may then create or configure the IP telephony connection 102 using the user data 126 and the destination information. In some examples, the IP telephony connection 102 is created with the user data 126. In other examples, the IP telephony connection is created and then the user data is transmitted to the IP telephony service 108 to configure the IP telephony connection 102. In still other examples, the telephony device 106 may do both. Once the IP telephony connection 102 is established or is about to be established, the wireless device 104 may disconnect from the long-range wireless network.

In other examples, instead of the wireless device 104 starting with a connection over a long-range wireless network, the wireless device 104 may be connected with a different IP telephony connection. In such examples, the wireless device 104 may roam among telephony devices 106 without interrupting a conversation.

In still other examples, in response to pairing, the telephony device 106 may simply "sign-on" using the user data 126 instead of creating the IP telephony connection 102. In other words, the user data 126 may include configuration settings to customize the telephony device 106 for use by the user associated with the unique identifier 114.

In a different example, the telephony device 106 may invoke privileged functionality using the user data 126 after pairing the wireless device 104 and the telephony device 106. For example, the telephony device may be able to configure the IP telephony connection 102 to have a particular Quality of Service (QoS). QoS is the ability to provide different priority to different applications, users, or data flows, or to guarantee a certain level of performance to a data flow. For example, a bit rate, delay, jitter, packet dropping probability and/or bit error rate may be configured to a determined value. QoS configurations are important if the network capacity is insufficient, especially for real-time streaming multimedia applications such as VoIP since it often requires fixed bit rate and is delay sensitive, and in networks where the capacity is a limited resource, for example in cellular data communication.

As an example, a company may wish to give packets associated with the IP telephony connection 102 a higher priority than other packets, where the user of the wireless device 104 is a chief executive officer. After pairing the wireless device 104 with the telephony device 106, the telephony device 106 may verify that the user of the wireless device 104 is the chief executive officer. The telephony device 106 may verify the user by checking that the user data 126 associated with the unique identifier 114 of the wireless device 104 is data that relates to the chief executive officer. If the user data 126 relates to the chief executive officer, the telephony device 106 may correspondingly configure the QoS of the IP telephony connection 102.

In another example of invoking privileged functionality, the telephony device 106 may permit a limited set of users to make long distance calls over a public switched telephone network (PSTN). After pairing the wireless device 104 with the telephony device 106, the telephony device 106 may verify that the user of the wireless device 104 is one of the limited set of users. If the user belongs to the limited set of users, the telephony device 106 may use the IP telephony service 108 to make a long distance call, where the IP telephony service 108 is an IP-PBX connected to the PSTN.

Alternatively, the telephony device 106 may transmit all or part of the user data 126 to the IP telephony service 108 and the IP telephony service 108 may verify that the user belongs to the limited set of users. The user data 126 may be transmitted as part of an authentication sequence between the telephony device 106 and the IP telephony service 108. The authentication sequence may be performed as part of a security protocol such as, Internet Protocol Security (IPSec), Transport Layer Security (TLS), Secure Sockets Layer (SSL), Secure Real-time Transport Protocol (SRTP), etc. Upon verification, the IP telephony service 108 may complete a long distance call on the PSTN.

Depending on the application, different degrees of trust may be desired when pairing the wireless device 104 with the telephony device 106. Different degrees of trust may also be desired when establishing a connection between the telephony device 106 and the IP telephony service 108. For example, a higher level of trust may be desired for making long distance phone calls over the PSTN than is desired for identifying a speaker during a conference call.

The level of trust between the wireless device 104 and the telephony device 106 may depend on the security method used in pairing the wireless device 104 with the telephony device 106. For example, Secure Simple Pairing includes at least four association models referred to as Numeric Comparison, Just Works, Out Of Band, and Passkey Entry.

The Numeric Comparison association model is designed for scenarios where both devices are capable of displaying a six digit number and both are capable of having the user enter "yes" or "no". A good example of this model is a cell phone and PC scenario. The user is shown a six digit number (from "000000" to "999999") on both displays and then asked whether the numbers are the same on both devices. If "yes" is entered on both devices, the pairing is successful.

The Just Works association model is primarily designed for scenarios where at least one of the devices does not have a display capable of displaying a six digit number nor does it have a keyboard capable of entering six decimal digits. A good example of this model is the cell phone and mono headset scenario where most headsets do not have a display. The Just Works association mode uses the Numeric Comparison protocol but the user is never shown a number and the application may simply ask the user to accept the connection (exact implementation is up to the end product manufacturer). The Just Works association model provides the same protection as the Numeric Comparison association model against passive eavesdropping but offers no protection against man-in-the-middle attacks. Therefore, the level of trust is higher with the Numeric Comparison association model than the Just Works association model.

The Passkey Entry association model is primarily designed for scenarios where one device has input capability but does not have the capability to display six digits and the other device has output capabilities. A good example of this model is the PC and keyboard scenario. The user is shown a six digit number (from "000000" to "999999") on the device with a display. They are then asked to enter the number on the other device. If the value entered on the second device is correct, the pairing is successful.

The Out Of Band (OOB) association model is primarily designed for scenarios where an OOB mechanism, i.e., not a Bluetooth wireless connection, is used to both discover the devices as well as to exchange or transfer cryptographic numbers used in the pairing process. In order to be effective from a security point of view, the OOB channel should provide different properties in terms of security compared to the Bluetooth radio channel. If properly implemented, the OOB channel should provide resistance to man in the middle attacks and/or privacy. The user's experience may differ depending on the out of band mechanism. As an example, with a Near Field Communication (NFC) solution, the user(s) will initially touch the two devices together. The user may then be asked if they wish to pair with the other device and if "yes" is entered the pairing is successful. This is a single touch experience where the exchanged information is used in both devices. The information exchanged may include cryptographic information such as public keys.

Similarly, the level of trust between the telephony device 106 and the IP telephony service 108 may depend on the security method used to authenticate when forming the pairing. Any method for authentication may be used. For example, authentication may be performed with a security protocol such as, Internet Protocol Security (IPSec), Transport Layer Security (TLS), Secure Sockets Layer (SSL), Secure Real-time Transport Protocol (SRTP), etc. Where no authentication is used, then the level of trust between the two is at its lowest.

As previously discussed, the pairing may be accomplished using Secure Simple Pairing as described in Version 2.1 of the Bluetooth specification. However, in other examples, the pairing may include a pairing described in any version of the Bluetooth specification. Pairing may also include a custom authentication process executed with an authentication layer included in a software layer above the Bluetooth implementation. The wireless device 104 and the telephony device 106 may be operable to perform the custom authentication process in response to a successful Bluetooth pairing. The custom authentication process may provide a higher level of trust between the devices, where, for example, one or both of the devices does not support Version 2.1 of the Bluetooth specification.

In still other examples, the wireless device 104 and the telephony device 106 may be operable to perform the pairing, where neither device is Bluetooth enabled. Where neither device is Bluetooth enabled, the wireless device 104 and the telephony device 106 may be operable to perform the custom authentication process as part of the pairing.

The custom authentication process may be any authentication method that is based on substantially unique public/private key pair associated with each of the wireless device 104 and the telephony device 106. Substantially unique public/private key pair are either unique to the device or to the user. The telephony device 106 may receive a proof of possession in addition to a public key from the wireless device 104.

The proof of possession is any verifiable data that provides some level of trust that either (1) the wireless device 104 really is the device associated with the public key received; or (2) the user of the wireless device 104 really is the user associated with the public key received. For example, the proof of possession may be a certificate issued by certificate authority in a public key infrastructure (PKI) configuration, a message digest generated from a message transmitted to the wireless device 104 from the telephony device 106, a shared secret, a user-provided PIN, biometric data, or any combination thereof.

In some examples, the user data 126 may include information used in the custom authentication process. For example, the user data 126 may include the proof of possession corresponding to the public key that the telephony device 106 expects to receive from the wireless device 104. During operation, the telephony device 106 may receive the public key as the unique identifier 114 from the wireless device 104. The telephony device 106 may receive the user data 126 associated with the unique identifier 114. The user data 126 may include the expected proof of possession. After the telephony device 106 receives the proof of possession from the wireless device 104, the telephony device 106 may compare the proof of possession with the expected proof of possession. If there is a match, then the custom authentication process may succeed or proceed. If there is not a match, then the custom authentication process may fail.

The unique identifiers 114 and the user data 126 may be stored in the database 122 using one or more methods. For example, if upon completion of the pairing, the unique identifier 114 is not yet stored in the database 122, then the telephony device 106 may store the unique identifier 114 in the database 122. The telephony device 106 may prompt the user to enter the user data 126 and then store the user data 126 in the database 122. For example, the telephony device 106 may display a message such as "please enter you name" and include a user's response in the user data. Alternatively, the wireless device 104 may prompt the user to enter the user data 126 with the input device 112 of the wireless device 104 and transmit the user's response to the telephony device 106.

In still other examples, the telephony device 106 may receive the user data 126 from a database of the wireless device 104 or over the network 103 from another source, such as another database, a network server, or a Lightweight Directory Access Protocol (LDAP) directory service. The telephony device 106 may store the received user data 126 in the database 122 of the telephony device.

As discussed previously, the telephony device 106 may not include the database 122. In that example, the telephony device 106 may store and/or receive the user data 126 from the database 122 over the network 103. In some such configurations, initial user data 126 may be obtained from the database 122. The database 122 may be pre-populated with the initial user data 126, using any manual or automated process. For example, an administrative interface that includes one or more web pages may permit manual entry of the user data 126 into the database 122.

Figure 2:
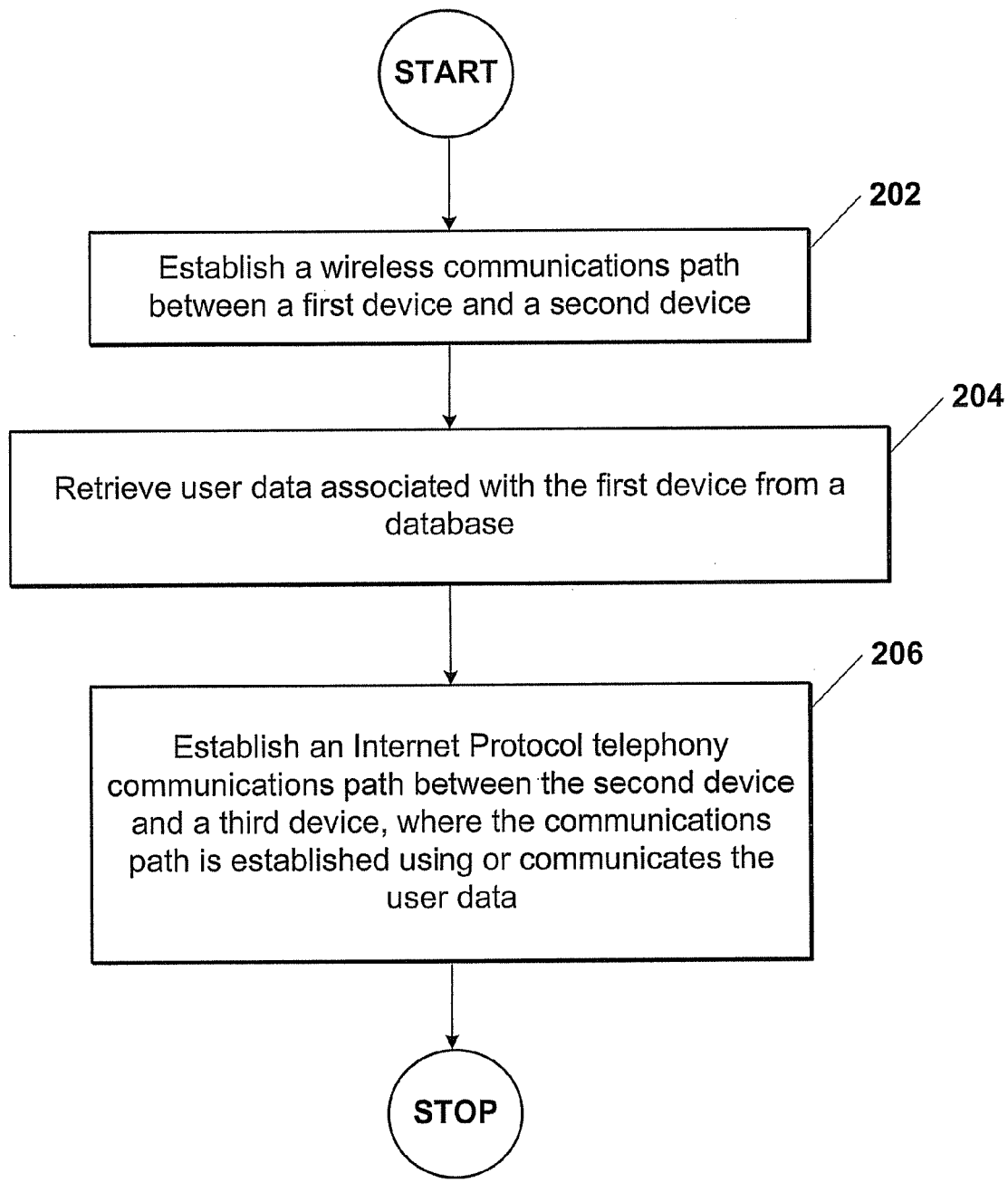
FIG. 2 illustrates one embodiment of a method for utilizing an identity based on a pairing of wireless devices.

FIG. 2 illustrates one embodiment of a method for utilizing an identity based on a pairing of wireless devices. Additional, different, or fewer acts may be performed. In act 202 of the embodiment illustrated in FIG. 2, the operation begins by establishing a wireless communications path 101 between a first device 104 and a second device 106.

In act 204, user data 126 associated with the first device 104 is retrieved from the database 122. In some examples, the user data 126 may be associated in the database 122 with a unique identifier 114 received from the first device 104.

In act 206, an IP telephony path 102 is established between the second device 106 and a third device 107. The Internet Protocol telephony communications path may be established using the user data. In a first example, the user data is communicated when initiating a connection. In a second example, the user data is communicated after initiating the connection. Establishing the communications path includes either or both examples.

Different components provide different functions for implementing the system 100. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system. Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. An apparatus comprising:
   wireless circuitry; and
   a processor, wherein the processor is configured to:
   create a wireless connection to a wireless device via the wireless circuitry;
   form a pairing between the apparatus and the wireless device over the wireless connection in response to the wireless device being within range of the apparatus, wherein the formation of the pairing is based on a unique identifier of the wireless device that identifies the wireless device during the formation of the pairing, and the unique identifier is received from the wireless device during the formation of the pairing;
   identify a user of the wireless device from user data associated in a database with the unique identifier of the wireless device in response to receipt of the unique identifier of the wireless device from the wireless device during the formation of the pairing;
   determine that an Internet Protocol telephony service should be established for the user by the apparatus based upon the user data;
   initiate configuration of the Internet Protocol telephony service between the apparatus and an Internet Protocol telephony service device in response to the formation of the pairing, wherein the configuration is based, at least in part, on the user data, and the configuration includes creation of an Internet Protocol telephony connection; and
   transmit data over the Internet Protocol telephony connection between the apparatus and the Internet Protocol telephony service device.

2. The apparatus of claim 1, wherein:
   the wireless circuitry comprises one or more of Near Field Communication wireless circuitry, Bluetooth wireless circuitry, or Radio Frequency Identification wireless circuitry, and
   the wireless connection comprises one or more of a Near Field Communication connection, a Bluetooth connection, or a Radio Frequency Identification connection.

3. The apparatus of claim 1, wherein the unique identifier comprises a public key.

4. The apparatus of claim 1, wherein the configuration comprises transmission of the user data to the Internet Protocol telephony service.

5. The apparatus of claim 1, wherein the Internet Protocol telephony service comprises an instant messaging service and the processor initiates the configuration by transmitting an indication of a user presence to the user identified from the user data.

6. The apparatus of claim 1, wherein the processor is further configured to configure the Internet Protocol telephony connection by determining Quality of Service of the Internet Protocol telephony connection.

7. The apparatus of claim 1, wherein the Internet Protocol telephony service comprises a conference bridge and the user data comprises a caller identity of the user of the wireless device.

8. The apparatus of claim 1, wherein the database comprises at least one of user schedule information or user meeting information.

9. A method comprising:
   creating, from a telephony device, a wireless connection to a wireless device via wireless circuitry of the telephony device;
   forming a pairing between the telephony device and the wireless device over the wireless connection in response to the wireless device being within range of the telephony device, wherein the formation of the pairing is based on a unique identifier of the wireless device that identifies the wireless device during the formation of the pairing, and the unique identifier is received from the wireless device during the formation of the pairing;
   identifying a user of the wireless device from user data associated in a database with the unique identifier of the wireless device in response to receipt of the unique identifier of the wireless device from the wireless device during the formation of the pairing;
   determining that an Internet Protocol telephony service should be established for the user by the telephony device based upon the user data;
   initiating configuration of the Internet Protocol telephony service between the telephony device and an Internet Protocol telephony service device in response to the formation of the pairing, wherein the configuration is based, at least in part, on the user data, and the configuration includes creation of an Internet Protocol telephony connection; and transmitting data over the Internet Protocol telephony connection between the telephony device and the Internet Protocol telephony service device.

10. The method of claim 9, wherein:

the wireless circuitry comprises one or more of Near Field Communication wireless circuitry, Bluetooth wireless circuitry, or Radio Frequency Identification wireless circuitry, and the wireless connection comprises one or more of a Near Field Communication connection, a Bluetooth connection, or a Radio Frequency Identification connection.

11. The method of claim 9, wherein the unique identifier comprises a public key.

12. The method of claim 9, wherein the configuration includes transmission of the user data to the Internet Protocol telephony service.

13. The method of claim 9, wherein the Internet Protocol telephony service comprises an instant messaging service and initiating the configuration comprises transmission an indication of a user presence to the user identified from the user data.

14. The method of claim 9, wherein initiating the configuration of the Internet Protocol telephony connection comprises determining Quality of Service of the Internet Protocol telephony connection.

15. The method of claim 9, wherein the Internet Protocol telephony service comprises a conference bridge and the user data comprises a caller identity of the user of the wireless device.

16. The method of claim 9, wherein the database comprises at least one of user schedule information or user meeting information.

17. One or more tangible non-transitory computer readable storage media encoded with software comprising computer executable instructions and when the software is executed operable to:

create, from a telephony device, a wireless connection to a wireless device via wireless circuitry of the telephony device;

form a pairing between the telephony device and the wireless device over the wireless connection in response to the wireless device being within range of the telephony device, wherein the formation of the pairing is based on a unique identifier of the wireless device that identifies the wireless device during the formation of the pairing, and the unique identifier is received from the wireless device during the formation of the pairing;

identify a user of the wireless device from user data associated in a database with the unique identifier of the wireless device in response to receipt of the unique identifier of the wireless device from the wireless device during the formation of the pairing;

determine that an Internet Protocol telephony service should be established for the user by the telephony device based upon the user data;

initiate configuration of the Internet Protocol telephony service between the telephony device and the Internet Protocol telephony service device in response to the formation of the pairing, wherein the configuration is based, at least in part, on the user data, and the configuration includes creation of an Internet Protocol telephony connection; and transmit data over the Internet Protocol telephony connection between the telephony devices and the Internet Protocol telephony service device.

18. The computer readable storage media of claim 17, wherein:

the wireless circuitry comprises one or more of Near Field Communication wireless circuitry, Bluetooth wireless circuitry, or Radio Frequency Identification wireless circuitry, and the wireless connection comprises one or more of a Near Field Communication connection, a Bluetooth connection, or a Radio Frequency Identification connection.

19. The computer readable storage media of claim 17, wherein the unique identifier comprises a public key.

20. The computer readable storage media of claim 17, further comprising instructions operable to transmit the user data to the Internet Protocol telephony service.

21. The computer readable storage media of claim 17, wherein the Internet Protocol telephony service is an instant messaging service and the configuration includes transmission an indication of a user presence to the user identified from the user data.

22. The computer readable storage media of claim 17, wherein the Internet Protocol telephony service comprises a conference bridge and the user data comprises a caller identity of the user of the wireless device.

* * * * *